United States Patent
Takeuchi et al.

(10) Patent No.: US 11,661,515 B2
(45) Date of Patent: May 30, 2023

(54) CURABLE SILICONE COMPOSITION, OPTICAL SEMICONDUCTOR DEVICE AND A METHOD OF MANUFACTURING THE SAME

(71) Applicant: DuPont Toray Specialty Materials Kabushiki Kaisha, Tokyo (JP)

(72) Inventors: Shunya Takeuchi, Chiba (JP); Sawako Inagaki, Chiba (JP); Akito Hayashi, Chiba (JP)

(73) Assignee: DuPont Toray Specialty Materials Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/931,657

(22) Filed: Jul. 17, 2020

(65) Prior Publication Data

US 2021/0032469 A1 Feb. 4, 2021

(30) Foreign Application Priority Data

Jul. 30, 2019 (JP) .............................. JP2019-139793

(51) Int. Cl.
*C08L 83/04* (2006.01)
*C09D 183/04* (2006.01)
*C08G 77/08* (2006.01)

(52) U.S. Cl.
CPC .............. *C08L 83/04* (2013.01); *C08G 77/08* (2013.01); *C09D 183/04* (2013.01); *C08L 2203/206* (2013.01)

(58) Field of Classification Search
CPC ......... C08G 77/12; C08G 77/20; C08L 83/04; B01J 23/40; H01L 33/56
See application file for complete search history.

(56) References Cited

U.S. PATENT DOCUMENTS

| | | | |
|---|---|---|---|
| 3,050,535 A1 | 11/2011 | Sato et al. | |
| 8,895,678 B2 | 11/2014 | Yoshitake | |
| 10,167,418 B2 | 1/2019 | Yamazaki et al. | |
| 2011/0160410 A1 | 6/2011 | Sagawa et al. | |
| 2014/0221581 A1* | 8/2014 | Yoshitake | C08L 83/04 525/477 |
| 2014/0367723 A1 | 12/2014 | Yamazaki et al. | |
| 2014/0377570 A1* | 12/2014 | Hirai | H01L 33/60 428/447 |

FOREIGN PATENT DOCUMENTS

| | | | |
|---|---|---|---|
| JP | 2006072667 A | 3/2006 | |
| JP | 2006299099 A | 11/2006 | |
| JP | 2006324596 A | 11/2006 | |
| JP | 2007246894 A | 9/2007 | |
| JP | 2008219285 A | 9/2008 | |
| JP | 2013001794 A | 1/2013 | |
| JP | 2014134990 A | 7/2014 | |
| JP | 2015011360 A | 1/2015 | |
| JP | 2015118574 A | 6/2015 | |
| JP | 2018172447 A | 11/2018 | |
| WO | 2015194158 A1 | 12/2015 | |

OTHER PUBLICATIONS

English language abstract and machine-assisted English translation for JP 2006-072667 extracted from espacenet.com database on Aug. 20, 2020, 17 pages.
English language abstract and machine-assisted English translation for JP 2006-299099 extracted from espacenet.com database on Aug. 20, 2020, 15 pages.
English language abstract and machine-assisted English translation for JP 2006-324596 extracted from espacenet.com database on Aug. 20, 2020, 11 pages.
English language abstract and machine-assisted English translation for JP 2007-246894 extracted from espacenet.com database on Aug. 20, 2020, 15 pages.
English language abstract for JP 2008-219285 extracted from espacenet.com database on Aug. 20, 2020, 2 pages.
English language abstract for JP 2013-001794 extracted from espacenet.com database on Aug. 20, 2020, 1 page.
English language abstract and machine-assisted English translation for JP 2014-134990 extracted from espacenet.com database on Aug. 20, 2020, 19 pages.
English language abstract and machine-assisted English translation for JP 2015-011360 extracted from espacenet.com database on Aug. 20, 2020, 19 pages.
English language abstract and machine-assisted English translation for JP 2015-134990 extracted from espacenet.com database on Aug. 20, 2020, 19 pages.
English language abstract for WO 2015/194158 extracted from espacenet.com database on Aug. 20, 2020, 2 pages.
English language abstract and machine-assisted English translation for JP 2018-172447 A extracted from espacenet.com database on Apr. 3, 2023, 14 pages.

* cited by examiner

*Primary Examiner* — Kuo Liang Peng
(74) *Attorney, Agent, or Firm* — Howard & Howard Attorneys PLLC

(57) ABSTRACT

A curable silicone composition encapsulates, coats, or adheres an optical semiconductor element. The curable silicone composition can form a cured product with sufficiently low gas-permeability, and with little weight decrease and little change in hardness even on long-term exposure to high temperatures. The curable silicone composition comprises resinous organopolysiloxane that contains at least one $(Ar_2SiO_{2/2})$ unit, wherein Ar denotes an aryl group.

9 Claims, No Drawings

CURABLE SILICONE COMPOSITION, OPTICAL SEMICONDUCTOR DEVICE AND A METHOD OF MANUFACTURING THE SAME

CROSS-REFERENCE TO RELATED APPLICATIONS

The present application claims priority to and all the benefits of Japanese Patent Application No. 2019-139793 filed on Jul. 30, 2019, which is hereby expressly incorporated herein by reference in its entirety.

TECHNICAL FIELD

The present invention relates to a curable silicone composition; more specifically, it relates to a curable silicone composition to be used for encapsulating, coating or adhering an optical semiconductor element. The present invention also relates to an optical semiconductor device provided with cured product of said curable silicone composition, and to a method of manufacturing the same.

BACKGROUND TECHNOLOGY

When curable silicone compositions are cured, they form cured products having excellent heat resistance, cold resistance, electrical insulation, weather resistance, water repellency, and transparency, and so they are used in a wide range of industrial fields. Specifically, compared to other organic materials, these cured products are less prone to discoloration and their physical properties deteriorate less, and so they are suitable for optical materials.

For example, patent documents 1-3 describe resin compositions for optical semiconductor element encapsulation or for optical lenses, obtained using cured silicone resin compositions that contain organopolysiloxane having 2 or more non-covalent double bond groups per molecule, organohydrogenpolysiloxane having 2 or more silicon atom-bonded hydrogen atoms per molecule, and a catalytic amount of platinum catalyst. Patent documents 4 and 5 describe hotmelt silicone resin compositions that are non-fluid at 25° C., have low surface tackiness, and are easily melted by heating.

DOCUMENTS OF THE PRIOR ART

Patent Documents

[Patent document 1] Japanese Unexamined Patent Publication No. 2006-299099
[Patent document 2] Japanese Unexamined Patent Publication No. 2007-246894
[Patent document 3] Japanese Unexamined Patent Publication No. 2006-324596
[Patent document 4] Japanese Unexamined Patent Publication No. 2013-001794
[Patent document 5] International Publication 2015/194158

SUMMARY OF THE INVENTION

Problem to be Solved by the Invention

However, conventional silicone resin compositions are disadvantageous in that they usually have high air-permeability, and so when they are used for encapsulating optical semiconductor elements such as LED chips, any corrosive gases in the air, such as sulfur compounds (e.g. hydrogen sulfide, sulfuric acid gas), can easily pass through and cause yellowing of the silicone encapsulant, or cause corrosion of metal electrodes, particularly silver (Ag) electrodes, on the substrate. Conventional silicone resin compositions are also disadvantageous in that when they are used in power LED devices, particularly CSPs and the like, high temperature use can lead to decreases in the weight and flexibility of the cured resin, which can result in cracking and discoloration of the cured resin.

The aim of the present invention is the provision of a curable silicone composition to be used for encapsulating, coating or adhering an optical semiconductor element, where the curable silicone composition can form a cured product with sufficiently low gas-permeability and with little weight decrease and little change in hardness even on long-term exposure to high temperatures.

Another aim of the present invention is the provision of an optical semiconductor device having excellent reliability and high temperature durability, and a method of manufacturing the same.

Means of Solving the Problem

As a result of their diligent investigation into solving the problem described above, the present inventors arrived at the present invention upon discovering that the abovementioned problem can be solved by a curable silicone composition comprising resinous organopolysiloxane that contains at least one $(Ar_2SiO_{2/2})$ unit (Ar denotes aryl group).

The inventive resinous organopolysiloxane is preferably a resinous organopolysiloxane that is curable by hydrosilylation.

The inventive resinous organopolysiloxane is preferably an alkenyl group-containing organopolysiloxane having at least two silicon-bonded alkenyl groups per molecule.

The inventive resinous organopolysiloxane is preferably represented by average unit formula (A-3): $(R^1_3SiO_{1/2})_a (R^1_2SiO_{2/2})_b(Ar_2SiO_{2/2})_{b'}(R^1SiO_{3/2})_c(SiO_{4/2})_d(XO_{1/2})_e$ (in the formula $R^1$ is an identical or different halogen-substituted or unsubstituted monovalent hydrocarbon group; Ar is an aryl group; 0.01-50 mol % of the total amount of $R^1$ is alkenyl groups; X is a hydrogen atom or alkyl group; the $R^1_2SiO_{2/2}$ unit represents units other than $Ar_2SiO_{2/2}$; and a, b, b', c, d, and e are numbers that satisfy $0 \leq a \leq 1.0$, $0 \leq b \leq 1.0$, $0 < b' \leq 1.0$, $0 \leq c < 0.9$, $0 \leq d < 0.5$, $0 \leq e < 0.4$, $a+b+b'+c+d=1.0$, and $c + d > 0$).

The inventive curable silicone composition can also contain linear alkenyl group-containing organopolysiloxane having at least two silicon-bonded alkenyl groups per molecule.

In the inventive curable silicone composition, the ratio of the amounts of linear alkenyl group-containing organopolysiloxane and resinous alkenyl group-containing organopolysiloxane: linear alkenyl group-containing organopolysiloxane/resinous alkenyl group-containing organopolysiloxane, is preferably greater than 0.2.

The inventive curable silicone composition can contain 10-90% by mass of the abovementioned resinous organopolysiloxane, based on the total mass of the composition.

The inventive curable silicone composition can also contain (B) organohydrogenpolysiloxane having at least two silicon-bonded hydrogen atoms per molecule, and (C) hydrosilylation catalyst.

The present invention also relates to an optical semiconductor device provided with cured product of the inventive curable silicone composition.

The present invention also relates to a method of manufacturing an optical semiconductor device, which includes a process where an optical semiconductor element is encapsulated, coated or adhered using the inventive curable silicone composition.

Advantages of the Invention

The inventive curable silicone composition can form a cured product with sufficiently low gas-permeability and with little weight decrease and little change in hardness even on long-term exposure to high temperatures. Consequently, when the inventive curable silicone composition is used for encapsulating, coating or adhering an optical semiconductor element, the resulting optical semiconductor device has excellent reliability and high temperature durability.

MODE OF THE INVENTION

The present invention is described in more detail below.

Curable Silicone Composition

The inventive curable silicone composition is characterized in that it comprises resinous organopolysiloxane that contains at least one $(Ar_2SiO_{2/2})$ unit (Ar denotes aryl group). The inventive curable silicone composition may contain one resinous organopolysiloxane that contains at least one $(Ar_2SiO_{2/2})$ unit (Ar denotes aryl group), or two or more resinous organopolysiloxanes that contain at least one $(Ar_2SiO_{2/2})$ unit (Ar denotes aryl group).

In the present specification, resinous organopolysiloxane refers to organopolysiloxane having a branched molecular structure or a network structure. In one embodiment, the resinous organopolysiloxane contains at least one siloxane unit (T unit) represented by $RSiO_{2/2}$ in its molecular structure.

The proportion of T units in the molecular structure of the inventive resinous organopolysiloxane containing at least one $(Ar_2SiO_{2/2})$ unit is preferably 0.1 or higher, more preferably 0.2 or higher, even more preferably 0.25 or higher, and particularly preferably 0.3 or higher. In a preferred embodiment, the proportion of T units in the molecular structure of the inventive resinous organopolysiloxane is ≤0.9, preferably ≤0.85, more preferably ≤0.8.

In another preferred embodiment, the proportion of siloxane units (Q units) represented by $SiO_{4/2}$ in the molecular structure of the inventive resinous organopolysiloxane is ≤0.2, preferably ≤0.1, and more preferably it does not contain any Q units. It should be noted that the abovementioned proportions of T units and Q units can be calculated based on the amount of siloxane units represented by general formula $R_2SiO_{1/2}$ (M unit), general formula $R_2SiO_{2/2}$ (D unit), general formula $RSiO_{3/2}$ (T unit), and formula $SiO_{4/2}$ (Q unit) in the resinous organopolysiloxane.

In the $(Ar_2SiO_{2/2})$ unit, Ar denotes aryl group. The aryl groups may be unsubstituted or substituted, and are preferably C6-20 aryl groups; examples are phenyl, tolyl, xylyl, naphthyl, anthracenyl, phenanthryl, and pyrenyl groups, and groups obtained by substituting hydrogen atoms of these aryl groups with alkyl groups such as methyl and ethyl groups; alkoxy groups such as methoxy and ethoxy groups; and halogen atoms such as chlorine and bromine atoms. The aryl groups are particularly preferably substituted or unsubstituted phenyl groups, and more preferably unsubstituted phenyl groups.

The proportion of $(Ar_2SiO_{2/2})$ units in the molecular structure of the inventive resinous organopolysiloxane is preferably 0.05 or higher, more preferably 0.1 or higher, even more preferably 0.15 or higher, and very preferably 0.2 or higher. In a preferred embodiment, the proportion of $(Ar_2SiO_{2/2})$ units in the molecular structure of the inventive resinous organopolysiloxane is ≤0.5, preferably ≤0.45, more preferably ≤0.4.

In the resinous organopolysiloxane containing at least one $(Ar_2SiO_{2/2})$ unit, preferably 40 mol % or more of the monovalent hydrocarbon groups bound to silicon atoms are aryl groups, and more preferably 50 mol % or more, particularly preferably 60 mol % or more, can be aryl groups.

The inventive curable silicone composition preferably contains, based on the total mass of the composition, 10% by mass or more, preferably 20% by mass or more, more preferably 30% by mass or more, and even more preferably 40% by mass or more, of resinous organopolysiloxane containing at least one $(Ar_2SiO_{2/2})$ unit. In a preferred embodiment, the inventive curable silicone composition contains, based on the total mass of the composition, ≤90% by mass, preferably ≤80% by mass, more preferably ≤70% by mass, of resinous organopolysiloxane containing at least one $(Ar_2SiO_{2/2})$ unit.

There are no particular limitations regarding the mechanism of curing the inventive curable silicone composition, and examples include hydrosilylation curing by alkenyl groups and silicon-bonded hydrogen atoms, dealcoholization condensation curing by silanol groups and silicon atom-bonded alkoxy groups, and radical curing by ultraviolet irradiation; of these, hydrosilylation curing is preferred because the whole is cured relatively quickly.

When the inventive curable silicone composition is cured by the hydrosilylation curing mechanism, the curable silicone composition can contain (A) alkenyl group-containing organopolysiloxane having at least two silicon-bonded alkenyl groups per molecule, (B) organohydrogenpolysiloxane having at least two silicon-bonded hydrogen atoms per molecule, and (C) hydrosilylation catalyst. Here, the inventive resinous organopolysiloxane containing at least one $(Ar_2SiO_{2/2})$ unit can correspond to component (A), or it can correspond to component (B), or it can correspond to component (A) and component (B). Specifically, the inventive resinous organopolysiloxane containing at least one $(Ar_2SiO_{2/2})$ unit can be alkenyl group-containing organopolysiloxane having at least two silicon-bonded alkenyl groups per molecule, or it can be organohydrogenpolysiloxane having at least two silicon-bonded hydrogen atoms per molecule, or it can be both.

The curing of the inventive curable silicone composition by hydrosilylation is described in more detail below.

(A) Alkenyl Group-Containing Organopolysiloxane

Component (A) is an alkenyl group-containing organopolysiloxane having at least 2 silicon atom-bonded alkenyl groups per molecule; it is the main agent in the hydrosilylation-curable silicone composition.

Examples of alkenyl groups that can be contained in component (A) are C2-12 alkenyl groups such as vinyl, allyl, butenyl, pentenyl, hexenyl, heptenyl, octenyl, nonenyl, decenyl, undecenyl, and dodecenyl groups, and vinyl group is preferred.

Examples of the molecular structure of component (A) are linear, linear with some branching, branched, cyclic, and 3D network structures. Component (A) can be one organopolysiloxane having such a molecular structure, or it can be a mixture of 2 or more such organopolysiloxanes.

In an embodiment of the present invention, component (A) can be a linear organopolysiloxane represented by (A-1) general formula: $R^1_3SiO(R^1_2SiO)_mSiR^1_3$ (in the formula, $R^1$ is an identical or different halogen-substituted or unsubstituted monovalent hydrocarbon group, where at least two $R^1$ per molecule are alkenyl groups, and m is an integer from 5-1000), and/or a branched organopolysiloxane (that is, a resinous organopolysiloxane) represented by (A-2) average unit formula: $(R^1_3SiO_{1/2})_a(R^1_2SiO_{2/2})_b(R^1SiO_{3/2})_c(SiO_{4/2})_d(XO_{1/2})_e$ (in the formula, $R^1$ is as described above, where at least two $R^1$ per molecule are alkenyl groups, X is a hydrogen atom or alkyl group, and a, b, c, d, and e are numbers that satisfy $0 \le a \le 1.0$, $0 \le b \le 1.0$, $0 \le c \le 0.9$, $0 \le d \le 0.5$, $0 \le e < 0.4$, $a+b+c+d=1.0$, and $c+d>0$).

The inventive curable silicone composition preferably contains linear organopolysiloxane and resinous organopolysiloxane as component (A). There are no particular limitations on the ratio of the amounts of resinous organopolysiloxane and linear organopolysiloxane as component (A); the proportion of the amounts, linear organopolysiloxane/resinous organopolysiloxane, is preferably higher than 0.1, more preferably higher than 0.2. Also, the ratio of the amounts, of linear organopolysiloxane/resinous organopolysiloxane, as component (A) is preferably ≤1, more preferably ≤0.9, even more preferably ≤0.8, and particularly preferably ≤0.7. By incorporating resinous organopolysiloxane and linear organopolysiloxane as component (A) in these ratios it is possible to form a cured product that undergoes little change in hardness even on long-term exposure to high temperatures.

Examples of halogen-substituted or unsubstituted monovalent hydrocarbon groups Win the abovementioned formulae are C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; C2-12 alkenyl groups such as vinyl, allyl, butenyl, pentenyl, hexenyl, heptenyl, octenyl, nonenyl, decenyl, undecenyl, and dodecenyl groups; and groups obtained by substituting some or all of the hydrogen atoms of these groups by halogen atoms such as fluorine, chlorine, and/or bromine atoms. $R^1$ may also be a hydroxyl group or an alkoxy group such as methoxy or ethoxy in small amounts, provided that this does not adversely affect the aim of the present invention.

$R^1$ is preferably chosen from phenyl group, C1-6 alkyl groups and cycloalkyl groups, and C2-6 alkenyl groups.

There are no particular limitations regarding the alkenyl group content in component (A) per molecule, and it is preferably such that 0.01-50 mol %, 0.05-40 mol %, or 0.09-32 mol % of the total amount of $R^1$ is alkenyl group. It should be noted that the alkenyl group content can be found by analysis such as Fourier transform infrared spectrophotometry (FT-IR), nuclear magnetic resonance (NMR), etc.

In a preferred embodiment, the inventive resinous organopolysiloxane containing at least one $(Ar_2SiO_{2/2})$ unit corresponds to abovementioned component (A). In such cases, the resinous organopolysiloxane can be represented by average unit formula (A-3) below (A-3): $(R^1_3SiO_{1/2})_a(R^1_2SiO_{2/2})_b(Ar_2SiO_{2/2})_{b'}(R^1SiO_{3/2})_c(SiO_{4/2})_d(XO_{1/2})_e$ (in the formula, $R^1$ and Ar are as described above, where at least two $R^1$ per molecule are alkenyl groups; X is a hydrogen atom or alkyl group; $R^1_2SiO_{2/2}$ represents a unit other than $Ar_2SiO_{2/2}$; and a, b, b', c, d, and e are numbers that satisfy $0 \le a \le 1.0$, $0 \le b \le 1.0$, $0 < b' \le 1.0$, $0 \le c < 0.9$, $0 \le d < 0.5$, $0 \le e < 0.4$, $a+b+b'+c+d=1.0$, and $c+d>0$).

In average unit formula (A-3), a is preferably in the range $0 \le a \le 0.5$, more preferably in the range $0 \le a \le 0.3$, very preferably in the range $0 \le a \le 0.2$, and particularly preferably in the range $0 \le a \le 0.1$. In average unit formula (A-3), b is preferably in the range $0 < b \le 0.8$, more preferably in the range $0.1 \le b \le 0.7$, and particularly preferably in the range $0.15 \le b \le 0.6$. In average unit formula (A-3), b' is preferably in the range $0.1 \le b' \le 0.7$, more preferably in the range $0.2 \le b' \le 0.6$, and particularly preferably in the range $0.25 \le b' \le 0.5$. In average unit formula (A-3), c is preferably in the range $0.1 \le c \le 0.95$, more preferably in the range $0.2 \le c \le 0.85$, and particularly preferably in the range $0.3 \le c \le 0.8$. In average unit formula (A-3), d is preferably in the range $0 \le d \le 0.4$, more preferably in the range $0 \le d \le 0.3$, and particularly preferably in the range $0 \le d \le 0.2$. In average unit formula (A-3), e is preferably in the range $0 \le e \le 0.3$, more preferably in the range $0 \le e \le 0.2$, and particularly preferably in the range $0 \le e \le 0.1$.

When the inventive curable silicone composition is curable by hydrosilylation: when the resinous organopolysiloxane containing at least one $(Ar_2SiO_{2/2})$ unit corresponds to (A), preferably, based on its total mass, the composition contains 10% by mass or more, preferably 20% by mass or more, more preferably 30% by mass or more, and even more preferably 40% by mass or more, of the resinous organopolysiloxane containing at least one $(Ar_2SiO_{2/2})$ unit that is this (A) component. In a preferred embodiment, based on its total mass, the composition contains ≤90% by mass, preferably ≤80% by mass, more preferably ≤70% by mass, of (A) component resinous organopolysiloxane containing at least one $(Ar_2SiO_{2/2})$ unit.

Also, the inventive curable silicone composition preferably contains, as component (A), linear organopolysiloxane and resinous organopolysiloxane containing at least one $(Ar_2SiO_{2/2})$ unit. There are no particular limitations regarding the ratio of the amounts of resinous organopolysiloxane containing at least one $(Ar_2SiO_{2/2})$ unit and linear organopolysiloxane as component (A), and the proportion of the amounts of linear organopolysiloxane/resinous organopolysiloxane containing at least one $(Ar_2SiO_{2/2})$ unit is preferably higher than 0.1, more preferably higher than 0.2. Also, the ratio of the amounts as component (A): linear organopolysiloxane/resinous organopolysiloxane containing at least one $(Ar_2SiO_{2/2})$ unit is preferably ≤0.9, more preferably ≤0.8, and particularly preferably >0.7. By incorporating resinous organopolysiloxane containing at least one $(Ar_2SiO_{2/2})$ unit and linear organopolysiloxane as component (A) in these ratios it is possible to form a cured product that undergoes little change in hardness even on long-term exposure to high temperatures.

(B) Organohydrogenpolysiloxane

The organohydrogenpolysiloxane having at least two silicon-bonded hydrogen atoms per molecule that is component (B) acts a crosslinking agent for the hydrosilylation of the curable silicone composition. Preferably, component (B) is a linear organohydrogenpolysiloxane having silicon-bonded hydrogen atoms at least at both ends of the molecular chain. One organopolysiloxane or a combination of 2 or more organopolysiloxanes can be used as component (B).

The component (B) silicon-bonded hydrogen atoms are preferably present at least at both ends of the molecular chain; silicon-bonded hydrogen atoms may be present only at both ends of the molecular chain, or they may also be present on side chains of the molecular chain.

Examples of groups other than hydrogen that can be bonded to the silicon atoms in component (B) are C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and groups obtained by substituting some or all of the hydrogen atoms of these groups by halogen atoms such as fluorine, chlorine, and/or bromine atoms. The silicon atoms in component (B) may also have a small amount of hydroxyl groups or alkoxy groups such as methoxy or ethoxy groups, provided that this does not adversely affect the aim of the present invention. For example, dimethylpolysiloxane capped with dimethylhydrogensiloxy groups at both ends of the molecular chain, and the like, can be used as component (B).

Examples of the molecular structure of component (B) are linear, linear with some branching, branched, cyclic, and 3D network structures; preferably it is linear with some branching, branched, or a 3D network structure.

In an embodiment of the present invention, component (B) can be an organohydrogenpolysiloxane represented by (B-1) average structural formula: $(R^2{}_3SiO_{1/2})_a(R^2{}_2SiO_{2/2})_b(R^2SiO_{3/2})_c(SiO_{4/2})_d(XO_{1/2})_e$ (in the formula, $R^2$ is a hydrogen atom or an identical or different halogen-substituted or unsubstituted monovalent hydrocarbon group, where at least two of $R^2$ are hydrogen atoms; X is a hydrogen atom or alkyl group; and a, b, c, d, and e are numbers that satisfy $0 \leq a \leq 1.0$, $0 \leq b \leq 1.0$, $0 \leq c < 0.9$, $0 \leq d < 0.5$, $0 \leq e < 0.4$, and $a+b+c+d=1.0$).

Examples of the $R^2$ halogen-substituted or unsubstituted monovalent hydrocarbon groups in the average structural formula are alkyl groups such as methyl, ethyl, propyl, isopropyl, butyl, isobutyl, tert-butyl, pentyl, neopentyl, hexyl, cyclohexyl, octyl, nonyl, and decyl groups; aryl groups such as phenyl, tolyl, xylyl, and naphthyl groups; aralkyl groups such as benzyl, phenethyl, and phenylpropyl groups; and halogen substituted alkyl groups such as 3-chloropropyl, 2-bromoethyl, and 3,3,3-trifluoropropyl groups.

In a preferred embodiment of the present invention, component (B) can be represented by the structural formula below:

In the formula, $R^4$ is an identical or different halogen-substituted or unsubstituted monovalent hydrocarbon group, and y is a number from 1-100, preferably from 1-10. Examples of the $R^4$ halogen-substituted or unsubstituted monovalent hydrocarbon groups are the same as for $R^2$.

In an embodiment of the present invention, the inventive resinous organopolysiloxane containing at least one $(Ar_2SiO_{2/2})$ unit can also be abovementioned component (B). Specifically, in an embodiment of the present invention, component (B) contains resinous organopolysiloxane containing at least one $(Ar_2SiO_{2/2})$ unit. In this case, this component (B) can be a resinous organohydrogenpolysiloxane represented by (B-2) average unit formula: $(R^3{}_3SiO_{1/2})_a(R^3{}_2SiO_{2/2})_b(Ar_2SiO_{2/2})_{b'}(R^3SiO_{3/2})_c(SiO_{4/2})_d(XO_{1/2})_e$ (in the formula, $R^3$ is the same as $R^2$; Ar represents an aryl group; at least two $R^3$ are hydrogen atoms; X is a hydrogen atom or alkyl group; and a, b, b', c, d, and e are numbers that satisfy $0 \leq a \leq 1.0$, $0 \leq b \leq 1.0$, $0 \leq b' \leq 1.0$, $0 \leq c \leq 0.9$, $0 \leq d \leq 0.5$, $0 \leq e \leq 0.4$, $a+b+b'+c+d=1.0$, and $c+d>0$).

When component (B) contains resinous organopolysiloxane containing at least one $(Ar_2SiO_{2/2})$ unit, the total amount of the $(Ar_2SiO_{2/2})$ unit-containing resinous organopolysiloxane contained in component (A), plus the resinous organopolysiloxane containing at least one $(Ar_2SiO_{2/2})$ unit contained in component (B), is the amount of resinous organopolysiloxane containing at least one $(Ar_2SiO_{2/2})$ unit in the present invention. In such cases, the total amount of resinous organopolysiloxane containing at least one $(Ar_2Si_{2/2})$ unit contained in component (A) and component (B) in inventive curable silicone composition, based on the total mass of the composition, is preferably 10% by mass or more, more preferably 20% by mass or more, even more preferably 30% by mass or more, very preferably 40% by mass or more, and preferably ≤90% by mass, more preferably ≤80% by mass, particularly preferably ≤70% by mass.

The component (B) content is such that the amount of silicon-bonded hydrogen atoms in this component per mol of silicon-bonded alkenyl groups in component (A) is 0.1-10 mol, preferably 0.5-5 mol, particularly preferably 0.8-1.2 mol. It should be noted that the number of silicon-bonded hydrogen atoms in component (B) can be found by analysis such as Fourier transform infrared spectrophotometry (FT-IR), nuclear magnetic resonance (NMR), etc.

(C) Hydrosilylation Catalyst

The hydrosilylation catalyst that is component (C) is a catalyst for promoting curing of the hydrosilylation curable silicone composition. Examples of component (C) are platinum catalysts such as chloroplatinic acid, alcohol solution of chloroplatinic acid, platinum-olefin complex, platinum-1,3-divinyl-1,1,3,3-tetramethyldisiloxane complex, and platinum-supporting powder; palladium catalysts such as tetrakis(triphenylphosphine)palladium, and mixtures of triphenylphosphine and palladium black; and rhodium catalysts; platinum catalysts are particularly preferred.

The amount of component (C) is the amount of catalyst; when a platinum catalyst is used as component (C), the practically preferable amount of platinum metal contained in the platinum catalyst is in the range of 0.01-1000 ppm, particularly preferably in the range of 0.1-500 ppm by weight unit in the silicone composition.

Optional components can be incorporated into the inventive curable silicone composition, provided that this does not adversely affect the aim of the present invention. Examples of optional components are acetylene compounds, organic phosphorus compounds, vinyl group-containing siloxane compounds, and hydrosilylation reaction inhibitors; inorganic fillers (also called "inorganic filler material") such as fumed silica, wet silica, ground quartz, titanium oxide, magnesium carbonate, zinc oxide, iron oxide, diatomaceous earth; inorganic fillers obtained by hydrophobically treating the surface of these inorganic fillers using organosilicon compound; organopolysiloxanes containing no silicon-bonded hydrogen atoms or silicon-bonded alkenyl groups; adhesiveness imparting agent, heat resistance imparting agent, cold resistance imparting agent, heat conductive filler, flame retardant imparting agent, thixotropy imparting agent, phosphors, coloring components such as dyes and pigments, e.g. carbon black, and solvents, etc.

Hydrosilylation inhibitor is a component for suppressing the hydrosilylation of the silicone composition; specific examples are acetylene-based reaction inhibitors such as ethynylcyclohexanol, and amine-, carboxylic acid ester-, and phosphite ester-based reaction inhibitors. The amount of reaction inhibitor added is usually 0.001-5% by mass of the silicone composition.

Examples of inorganic fillers are fumed silica, crystalline silica, precipitated silica, hollow filler, silsesquioxane, fumed titanium dioxide, magnesium oxide, zinc oxide, iron oxide, aluminum hydroxide, magnesium carbonate, calcium carbonate, zinc carbonate, layered mica, diatomaceous earth, glass fiber and other inorganic fillers; and fillers obtained by subjecting these fillers to surface hydrophobic treatment using an organosilicon compound such as organoalkoxysilane compound, organochlorosilane compound, organosilazane compound or low molecular weight siloxane compound. Silicone rubber powder, silicone resin powder and the like can also be incorporated. Specifically, the amount of inorganic filler incorporated is preferably ≤20% by mass, particularly preferably ≤10% by mass, of the silicone composition.

Phosphors are widely used in light-emitting diodes (LEDs); examples of phosphors used are yellow-, red-, green-, and blue phosphors such as oxide phosphors, oxynitride phosphors, nitride phosphors, sulfide phosphors, oxysulfide phosphors, and fluoride phosphors, and mixtures of at least 2 of these. Examples of oxide phosphors are cerium ion-doped yttrium aluminum garnet (YAG) green to yellow phosphors; cerium ion-doped terbium aluminum garnet (TAG) yellow phosphors; and cerium and europium ion-doped silicate green to yellow phosphors. Examples of oxynitride phosphors are europium ion-doped silicon aluminum oxygen nitrogen (SiAlON) red-green phosphors. Examples of nitride phosphors are europium ion-doped calcium strontium aluminium silicon nitrogen (CaSrAlSiN) red phosphors. Examples of sulphide phosphors are copper ion- and aluminium ion-doped ZnS green phosphors. Examples of oxysulphide phosphors are europium ion-doped $Y_2O_2S$ red phosphors. Examples of fluoride phosphors are KSF phosphors ($K_2SiF_6$:$Mn^{4+}$), etc.

Organic or inorganic pigments and dyes can be used as coloring components; these can be used individually, or two or more can be used in combination. When phosphors are used, the amount incorporated is ≤90% by mass, preferably ≤80% by mass, particularly ≤70% by mass, of the silicone composition. Also, black pigment can be used to prevent light interference and improve color contrast in the display. For example, iron oxide, aniline black, activated carbon, graphite, carbon nanotubes, carbon black or the like can be used as black pigment. Specifically, the amount of coloring component incorporated is ≤30% by mass, preferably ≤15% by mass, particularly preferably ≤5% by mass, of the silicone composition.

Examples of adhesiveness imparting agents are epoxy group-containing alkoxysilane, acrylic group-containing alkoxysilane, amino group-containing alkoxysilane, reaction condensates of silane coupling agents, organic titanium compounds, organic aluminum compounds, organic zirconium compounds, ethyl polysilicate [average molecular formula $Si_mO_{(m-1)}(OC_2H_5)_{2(m+1)}$ (in the formula, m is, on average, 5)], etc. Of these, abovementioned organic titanium compounds, reaction condensates of silane coupling agents, ethyl polysilicate [average molecular formula $Si_mO_{(m-1)}(OC_2H_5)_{2(m+1)}$ (in the formula, m is, on average, 5), $SiO_2$ content 40% by weight, viscosity 5mPa+s], and mixtures thereof, are preferred.

The inventive curable silicone composition can be prepared by mixing the various components. The method of mixing the various components should be a conventional known method, and there are no particular limitations on this; usually it is simple mixing to obtain a uniform mixture. When solid components such as inorganic filler are included as optional components, it is preferable to use a mixing device for the mixing. There are no particular limitations regarding this mixing device, and examples include single- and twin-screw continuous mixers, double roller mixers, Ross mixers, Hobart mixers, dental mixers, planetary mixers, kneader mixers, and Henschel mixers.

The inventive curable silicone composition is to be used for encapsulating, coating or adhering an optical semiconductor element. The cured product obtained using the inventive curable silicone composition has sufficiently low gas-permeability (water vapor permeability and/or oxygen permeability), and undergoes little weight decrease and little change in hardness even on long-term exposure to high temperatures. Consequently, the cured product does not readily discolor even on exposure to corrosive gas, and so it is possible to inhibit corrosion of electrodes that have been encapsulated, coated or adhered using the cured product. Also, discoloration and cracking of the cured product can be inhibited even when the inventive curable silicone composition is used in power LED devices such as CPS that are used for long periods at high temperatures. Consequently, the inventive curable silicone composition allows the manufacture of optical semiconductor devices having excellent reliability and high temperature durability.

Optical Semiconductor Device

In the inventive optical semiconductor device, an optical semiconductor element is provided with cured product of the abovementioned inventive curable silicone composition. Specifically, the optical semiconductor element is encapsulated, coated or adhered using cured product of the abovementioned inventive curable silicone composition. The optical semiconductor element can be, for example, a photoemitter or photodetector for a photocoupler, solid-state imaging, a phototransistor, photodiode, semiconductor laser, or light-emitting diode (LED); it is particularly preferably a light-emitting diode (LED).

Light-emitting diodes (LEDs) emit light from the upper, lower, left and right sides of the optical semiconductor element, and so it is undesirable for parts constituting the light-emitting diode (LED) to absorb light, and materials having high light transmittance or high reflectance are preferred for said parts. Consequently, the substrate on which the optical semiconductor element is mounted also preferably comprises a material of high light transmittance or high reflectance. Examples of this substrate on which the optical semiconductor element is mounted are conductive metals such as silver, gold and copper; non-conductive metals such as aluminum and nickel; thermoplastic resins mixed with white pigment, such as PPA and LCP; thermosetting resins containing white pigment, such as epoxy resin, BT resin, polyimide resin and silicone resin; and ceramics such as alumina and alumina nitride.

In the inventive optical semiconductor device, encapsulation, coating or adhesion is performed using cured product of the inventive curable silicone composition, and so the inventive optical semiconductor device has excellent reliability and high temperature durability.

Method of Manufacturing the Optical Semiconductor Device

The inventive method of manufacturing a semiconductor device is a method of manufacturing an optical semiconductor device using the inventive curable silicone composition. Therefore, the inventive method of manufacturing a semiconductor device includes a process whereby an optical semiconductor element is encapsulated, coated or adhered using curable silicone composition; for example, it includes a process whereby the inventive curable silicone composition is used as encapsulant, coating agent and/or adhesive agent for an optical semiconductor element. This method of manufacturing an optical semiconductor device uses the inventive curable silicone composition and can therefore provide an optical semiconductor device having high reliability and high-temperature durability.

EXAMPLES

The inventive curable silicone composition is described in more detail by means of the following examples and comparative examples.

Examples 1 to 6 and Comparative Examples 1 to 5

Curable silicone compositions were prepared by mixing the respective components in the proportions (parts by weight) shown in Table 1. It should be noted that in Table 1, H/Vi denotes the mol ratio of the silicon-bonded hydrogen atoms contained in the silicon-bonded hydrogen atom-containing organopolysiloxane, per mol of alkenyl groups contained in the alkenyl group-containing organopolysiloxane in the respective composition. Also, below, Me represents methyl group, Vi represents vinyl group, and Ph represents phenyl group.

Component a-1: alkenyl group-containing organopolysiloxane resin represented by average structural formula (ViMeSiO$_{2/2}$)$_{25}$(Ph$_2$SiO$_{2/2}$)$_{30}$(PhSiO$_{3/2}$)$_{45}$ Component a-2: alkenyl group-containing organopolysiloxane represented by average structural formula (ViPhMeSiO$_{1/2}$)$_{23}$(PhSiO$_{3/2}$)$_{77}$ Component a-3: alkenyl group-containing organopolysiloxane represented by average structural formula (ViMe$_2$SiO$_{1/2}$)$_{25}$(PhSiO$_{3/2}$)$_{75}$ Component a-4: alkenyl group-containing organopolysiloxane represented by general formula (ViMe$_2$SiO$_{1/2}$)(PhMeSiO$_{2/2}$)$_{20}$(ViMe$_2$SiO$_{1/2}$)

Component a-5: alkenyl group-containing organopolysiloxane resin represented by average structural formula (ViMeSiO$_{2/2}$)$_{25}$(Ph$_2$SiO$_{2/2}$)$_{24}$(PhSiO$_{3/2}$)$_{51}$ Component a-6: alkenyl group-containing organopolysiloxane resin represented by average structural formula (ViMeSiO$_{2/2}$)$_{25}$(Ph$_2$SiO$_{2/2}$)$_{38}$(PhSiO$_{3/2}$)$_{37}$ Component a-7: alkenyl group-containing organopolysiloxane resin represented by average structural formula (ViMeSiO$_{2/2}$)$_{25}$(Ph$_2$SiO$_{2/2}$)$_{35}$(PhSiO$_{3/2}$)$_{40}$ Component a-8: alkenyl group-containing organopolysiloxane resin represented by average structural formula (ViMeSiO$_{2/2}$)$_{30}$(Ph$_2$SiO$_{2/2}$)$_{30}$(PhSiO$_{3/b\ 2}$)$_{40}$ Component a-9: alkenyl group-containing organopolysiloxane resin represented by average structural formula (ViMeSiO$_{2/2}$)$_{27}$(Ph$_2$SiO$_{2/2}$)$_{27}$(PhSiO$_{3/2}$)$_{46}$ Component a-10: alkenyl group-containing organopolysiloxane represented by average structural formula (ViMe$_2$SiO$_{1/2}$)$_{25}$(Ph$_2$SiO$_{2/2}$)$_{25}$(PhSiO$_{3/2}$)$_{50}$ Component a-11: alkenyl group-containing organopolysiloxane resin represented by average structural formula (ViPhMeSiO$_{1/2}$)$_{25}$ (Ph$_2$SiO$_{2/2}$)$_{30}$ (PhSiO$_{3/2}$)$_{45}$ Component a-12: alkenyl group-containing organopolysiloxane resin represented by average structural formula (ViMe$_2$SiO$_{1/2}$)$_{25}$(Ph$_2$SiO$_{2/2}$)$_{30}$(PhSiO$_{3/\ 2}$)$_{45}$ Component b: diphenylsiloxane capped with dimethylhydrogensiloxy groups at both ends of the molecular chain, represented by general formula (HMe$_2$SiO$_{1/2}$)(Ph$_2$SOi$_{2/2}$)(HMe$_2$SiO$_{1/2}$)

Component c: complex of platinum and 1,3-divinyl-1,1,3,3-tetramethyldisiloxane having a platinum concentration of 4.0% by mass Component d: 1,3,5,7-tetramethyl-1,3,5,7-tetravinylcyclotetrasiloxane The resulting curable silicone compositions of examples 1-6 and comparative examples 1 and 2 were evaluated as follows. The results are shown in Table 1. The silicone compositions of comparative examples 3-5 did not cure and were therefore not evaluated as follows.

Decrease in Weight on Heating

Cured product was prepared by heating the curable silicone composition at 150° C. for 2 hours. Then 20 g of the resulting cured product was stored at 200° C. for 1000 hours, after which the decrease in weight on heating was measured. Those that exhibited a <6% decrease in weight on heating were deemed "good", and those that exhibited a 6% or more decrease in weight on heating were deemed "poor".

Change in Storage Modulus at High Temperature (200° C.)

Cured product was prepared by heating the curable silicone composition at 150° C. for 2 hours. The storage modulus of the cured product was measured before and after heat treatment (200° C. for 1000 hours), and the rate of change in the storage modulus due to the storage at high temperature was calculated. Those that exhibited a <10 fold change in storage modulus before and after heat treatment were deemed "good", and those that exhibited a 10 or more fold change in storage modulus before and after heat treatment were deemed "poor". The storage modulus was measured using an Anton Paar MCR302, with temperature rising at 3° C./min.

Cured products that exhibit little change in storage modulus even after long term storage at high temperature will exhibit no change in hardness and no decrease in flexibility, even after long term storage at high temperature. Cured products that exhibit little weight decrease on heating and little change in storage modulus even after long term storage at high temperature are unlikely to discolor or crack even when used for LED encapsulant, for example, and they can prevent cracks and misbonding even when used to adhere bonding chip bonding pads, for example.

Water Vapor Transmission Rate

The curable silicone composition was cured using a press at 150° C. for 2 hours, to prepare a sheet-shaped cured product having a thickness of 1 mm The water vapor transmission rate of the cured film was measured at 40° C., relative humidity 90% using a water vapor transmission rate measuring device (Model 7002 manufactured by Systech Illinois). If the water vapor transmission rate was <13 g/m$^2$·24 hr it was deemed "good", and if it was 13 g/m$^2$·24 hr or higher it was deemed "poor".

Permeability to Oxygen

The curable silicone composition was cured using a press at 150° C. for 2 hours, to prepare a sheet-shaped cured product having a thickness of 1 mm The oxygen transmission rate of the cured product was measured at 23° C. using an oxygen transmission rate measuring device (Model 8001 manufactured by Systech Illinois). If the oxygen transmission rate was <600 cc/m²·24 hr it was deemed "good", and if the oxygen transmission rate was 600 cc/m²·24 hr or higher it was deemed "poor".

TABLE 1

| Component | Example 1 | Comparative Example 1 | Comparative Example 2 |
|---|---|---|---|
| a-1 | 63.5 | — | — |
| a-2 | — | 64.3 | — |
| a-3 | — | — | 61.3 |
| a-4 | 15 | 15 | 15 |
| b | 21.3 | 20.5 | 23.5 |
| d | 0.2 | 0.2 | 0.2 |
| Total | 100 | 100 | 100 |
| c | 0.00,875 | 0.00,875 | 0.00,875 |
| Platinum content (ppm) | 3.5 | 3.5 | 3.5 |
| H/Vi | 1.0 | 1.0 | 1.0 |
| Evaluation | | | |
| Weight loss on heating | Good | Poor | Good |
| Change in storage modulus | Good | Poor | Poor |
| Permeability to water vapour | Good | Good | Poor |
| Permeability to oxygen | Good | Good | Poor |

TABLE 2

| | Example 2 | Example 3 | Example 4 | Example 5 | Example 6 |
|---|---|---|---|---|---|
| Component | | | | | |
| a-5 | 63.1 | — | — | — | — |
| a-6 | — | 63.4 | — | — | — |
| a-7 | — | — | 63.5 | — | — |
| a-8 | — | — | — | 60.4 | — |
| a-9 | — | — | — | — | 62.0 |
| a-4 | 15 | 15 | 15 | 15 | 15 |
| b | 21.7 | 21.1 | 21.2 | 24.4 | 22.8 |
| d | 0.2 | 0.5 | 0.3 | 0.2 | 0.2 |
| Total | 100 | 100 | 100 | 100 | 100 |
| c | 0.00875 | 0.00875 | 0.00875 | 0.00875 | 0.00875 |
| Platinum content (ppm) | 3.5 | 3.5 | 3.5 | 3.5 | 3.5 |
| H/Vi | 1.0 | 1.0 | 1.0 | 1.0 | 1.0 |
| Evaluation | | | | | |
| Weight loss on heating | Good | Good | Good | Good | Good |
| Change in storage modulus | Good | Good | Good | Good | Good |
| Permeability to water vapour | Good | Good | Good | Good | Good |
| Permeability to oxygen | Good | Good | Good | Good | Good |

TABLE 3

| Component | Comparative Example 3 | Comparative Example 4 | Comparative Example 5 |
|---|---|---|---|
| a-10 | 63.3 | — | — |
| a-11 | — | 65.2 | — |
| a-12 | — | — | 63.7 |
| a-4 | 15 | 15 | 15 |
| b | 21.5 | 19.6 | 21.1 |
| d | 0.2 | 0.2 | 0.2 |
| Total | 100 | 100 | 100 |
| c | 0.00875 | 0.00875 | 0.00875 |
| Platinum content (ppm) | 3.5 | 3.5 | 3.5 |
| H/Vi | 1.0 | 1.0 | 1.0 |
| Evaluation | Not cured | Not cured | Not cured |

INDUSTRIAL USE

The inventive curable silicone composition is useful as an encapsulant, coating agent, or adhesive agent for optical semiconductor elements such as photoemitters and photodetectors for photocouplers, solid-state imaging, phototransistors, photodiodes, semiconductor lasers, light-emitting diodes (LEDs), etc. Also, the inventive optical semiconductor device is useful as an optical semiconductor device for optical devices, optical equipment, lighting equipment, and lighting devices, etc.

The invention claimed is:

1. A curable silicone composition for encapsulating, coating or adhering an optical semiconductor element, where said curable silicone composition comprises linear alkenyl group-containing organopolysiloxane having at least two silicon-bonded alkenyl groups per molecule; and resinous organopolysiloxane represented by average unit formula (A-3):

$(R^1_2SiO_{2/2})_b (Ar_2SiO_{2/2})_{b'} (R^1SiO_{3/2})_c (SiO_{4/2})_d$ (in the formula, $R^1$ is an identical or different, halogen-substituted or unsubstituted, alkyl groups, aryl groups, aralkyl groups or alkenyl groups; Ar is an aryl group; 0.01-50 mol % of the total amount of $R^1$ is alkenyl groups; the $(R^1_2SiO_{2/2})$ unit represents units other than $Ar_2SiO_{2/2}$; and b, b', c, and d are numbers that satisfy 0≤b≤1.0, 0≤b'≤1.0, 0≤c<0.9, 0≤d<0.5, b+b'+c d=1.0, and c+d>0);

wherein the weight content ratio of the linear alkenyl group-containing organopolysiloxane based on the resinous alkenyl group-containing organopolysiloxane is greater than 0.2; and wherein a cured product of said curable silicone composition is light transmissible.

2. The curable silicone composition as claimed in claim 1, where said curable silicone composition contains 10-90% by mass of said resinous organopolysiloxane, based on the total mass of said composition.

3. The curable silicone composition as claimed in claim 1, where said curable silicone composition also contains (B) organohydrogenpolysiloxane having at least two silicon-bonded hydrogen atoms per molecule, and (C) hydrosilylation catalyst.

4. An optical semiconductor device provided with cured product of said curable silicone composition as claimed in claim 1.

5. The optical semiconductor device as claimed in claim 4, wherein the cured product is light transparent.

6. A method of manufacturing an optical semiconductor device, which includes encapsulating, coating, or adhering an optical semiconductor element using said curable silicone composition as claimed in claim 1.

7. A method of manufacturing an optical semiconductor device as claimed in claim 6, wherein the cured product of said curable silicone composition is light transparent.

8. The curable silicone composition as claimed in claim 1, wherein both of $R^1$ in $(R^1{}_2SiO_{2/2})$ are not alkyl group simultaneously.

9. The curable silicone composition as claimed in claim 1, wherein d is 0.

* * * * *